Patented Jan. 23, 1945

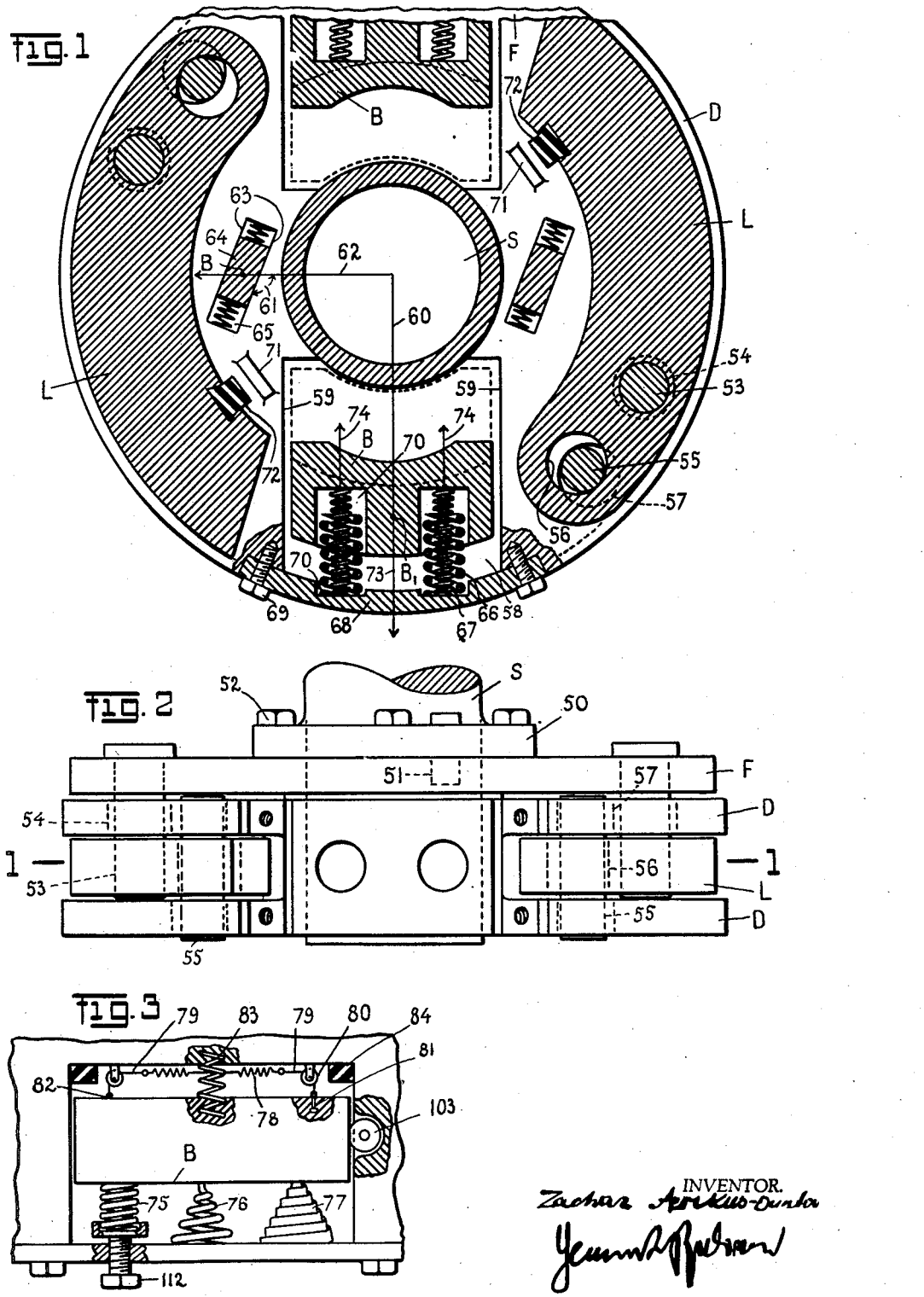

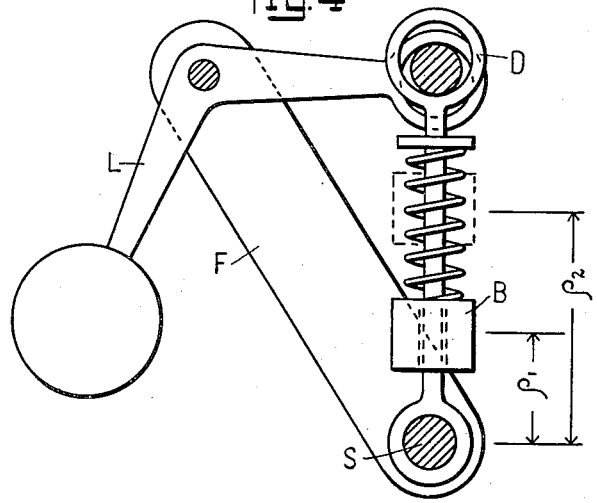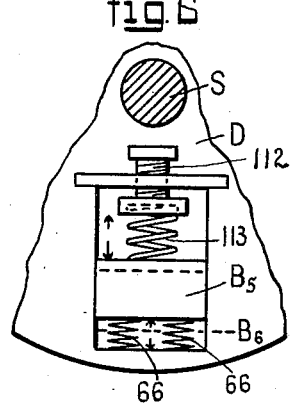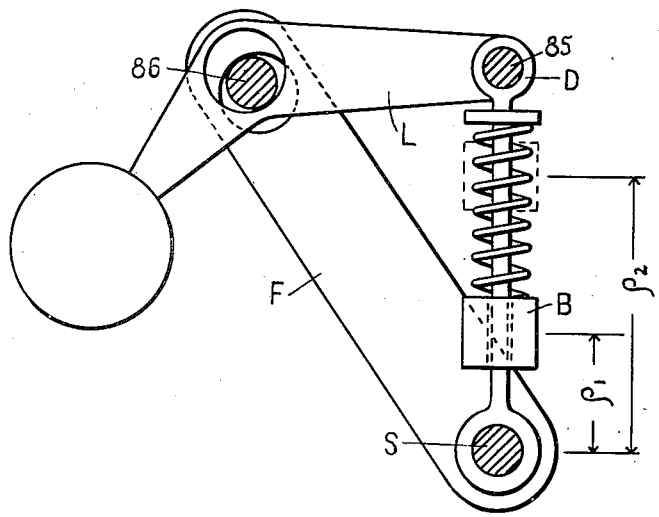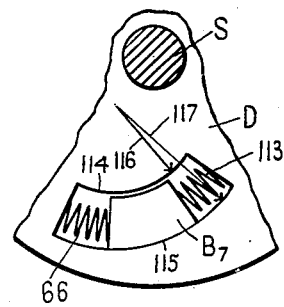

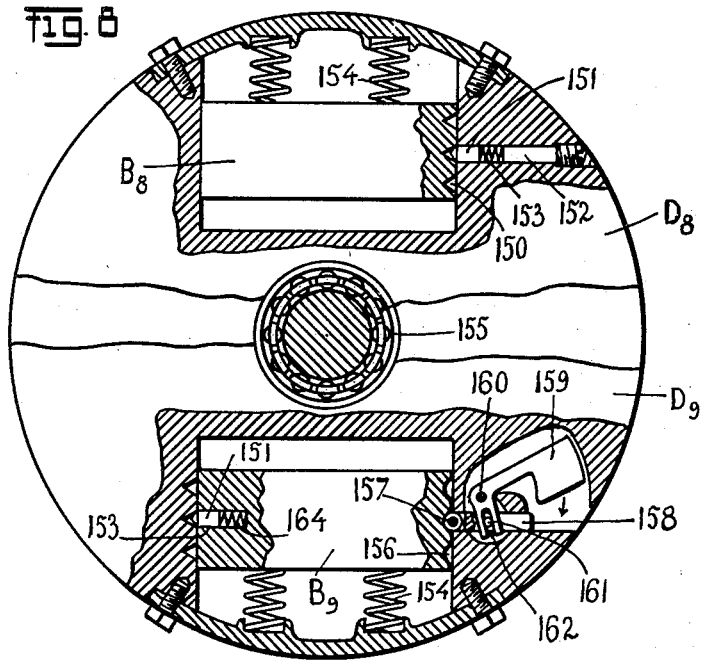
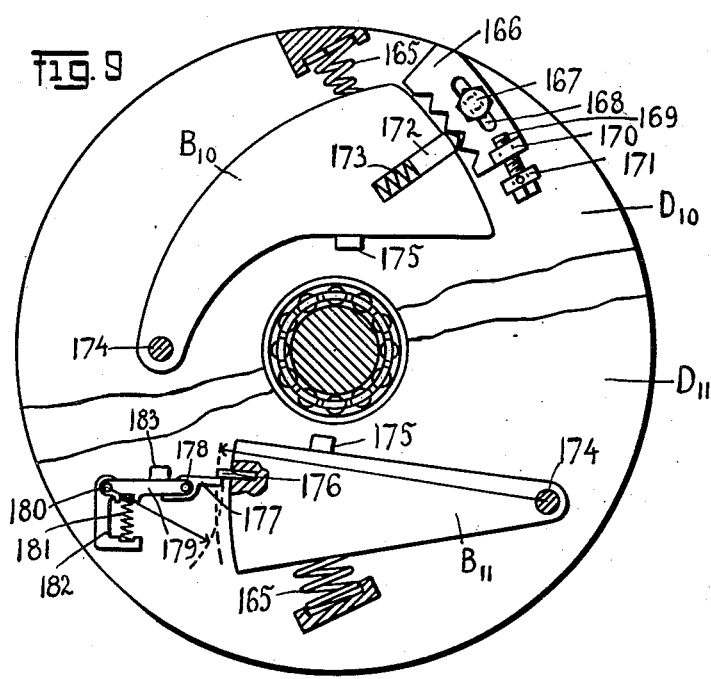

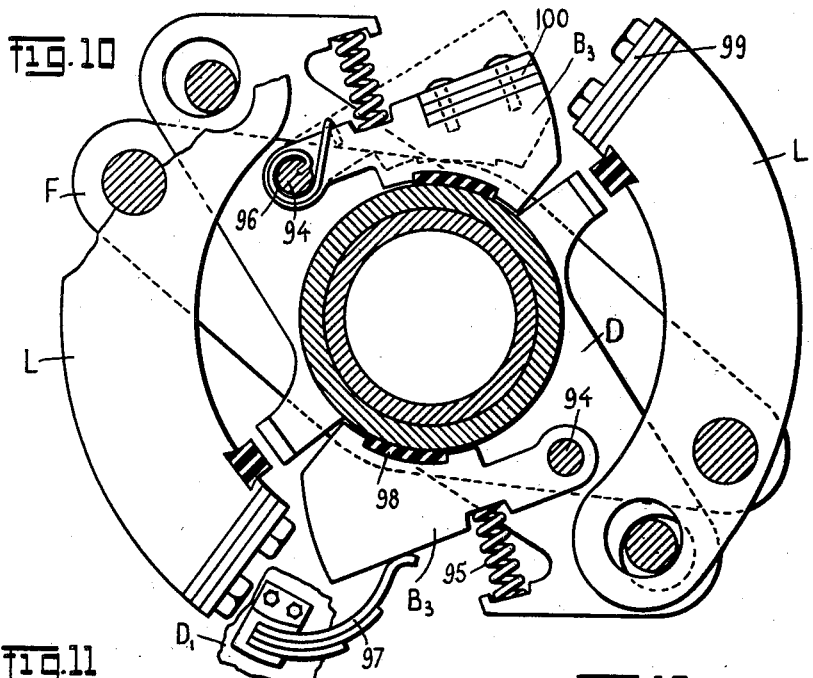
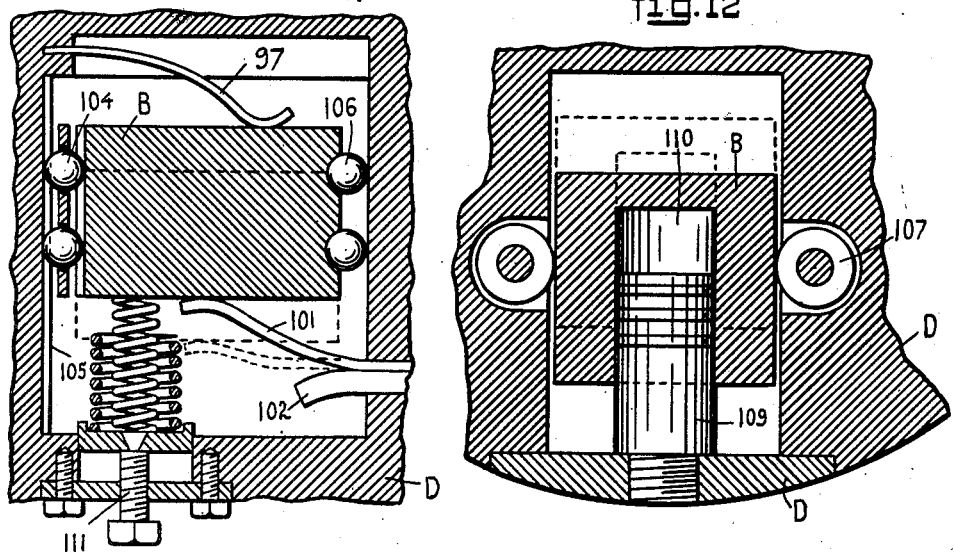

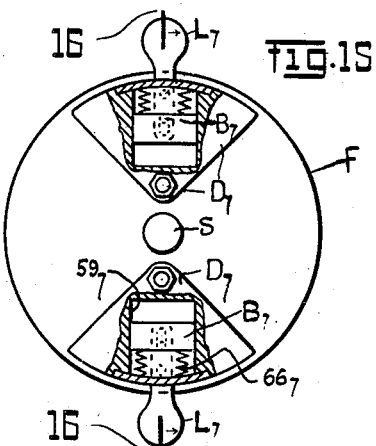
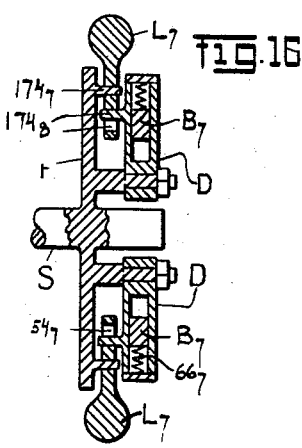
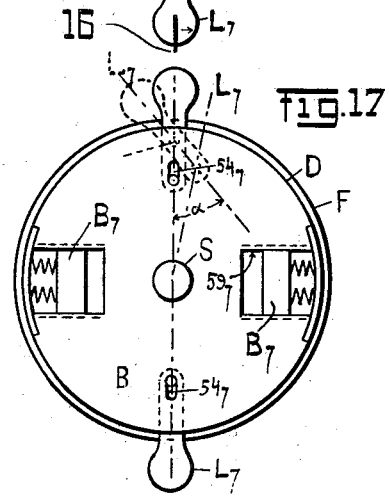
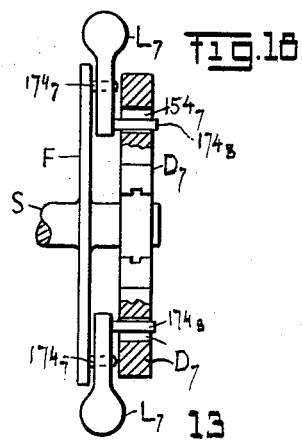
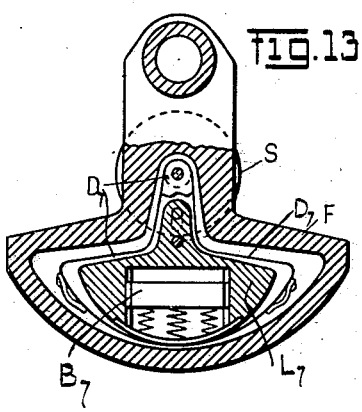
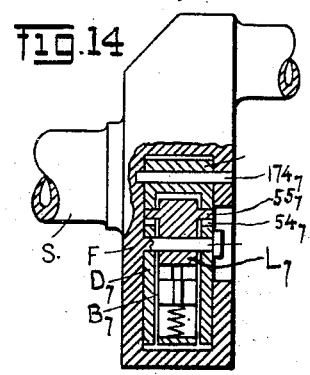

2,367,709

UNITED STATES PATENT OFFICE 2,367,709

POLYHARMONIC SELF-TUNING DAMPER MEANS

Zachar Arkus-Duntov and George A. Rubissov New York, N. Y.

Application July 14, 1941, Serial No. 402,344

25 Claims. (Cl. 74—574)

This invention is an improvement on a dynamic damper providing polyharmonic effect for all orders and all kinds of disturbances, torsional vibrations, torsional jerks, oscillations and other irregularities occurring in a rotatable part at any speed of rotation, and is particularly concerned with the Salomon dynamic dampers as described in the U. S. patent applications, Serial Nos. 333,561 and 335,081, being essentially applicable in combination therewith, as well as with those dampers described in the Rubissow U. S. patent applications Nos. 334,340, 377,138, 377,137, 377,645.

Present-day dampers for torsional oscillations and irregularities can generally be tuned to only one order of disturbance, i. e. they displace the natural frequency sufficiently out of resonance only for a single order of disturbance. Should the oscillating system be subjected to another order of disturbance, than the natural frequency is only very slightly displaced from its former value with, accordingly, very limited results as a rule.

The herein described invention is of very simple construction. It is extremely reliable in performance as well as an economical means for the automatic tuning of all dampers now being employed, permitting automatic adjustment thereof while the system is in rotation for all possible ranges of disturbing orders and at any and all speeds of rotation.

Tuning formulae for all known centrifugal pendulum dampers demonstrate that the frequency of the damper is proportionate to the rotating speed of the shaft, i. e. that the damper can make a predetermined number of oscillations during one revolution of the shaft. If the damper is tuned to one order of disturbance, the damper can anihilate the action of that order at any speed.

Practically speaking, a disturbing order is significant only when its frequency is in resonance with the natural frequency of the oscillating system, a condition that happens at only one speed, and at the speed which corresponds to the disturbing order.

If, however, the oscillating system is subjected to the influence of several orders of disturbance, the action of the damper is efficient only for the order of disturbance to which it is tuned, and not for any other order.

This invention relates to a device which is capable of arranging the tuning of the damper so that the tuning changes in relation to the rotating speed of the oscillating system.

In a rotating body (machine part, shaft, reciprocating engine, etc.) which is subjected to the action of different orders of disturbance, and runs at various speeds throughout its performance, the different orders of disturbance corresponding to the different rates of speed, some orders of disturbance will be in resonance with the natural frequency of the oscillating system.

The above and further objects and novel features will be more fully apparent from the following detailed description when the same is read in connection with the accompanying drawings. It is to be expressly understood however, that the drawings are for purposes of illustration only, and are not intended as a definition of the limits of the invention.

Figure 1 is a cross-sectional plan-view 1—1 of Figure 2, with parts broken out of one embodiment in combination with the Salomon type damper, as covered in the U. S. patent applications identified above, provided with tuning body.

Figure 2 is a side-view of Figure 1.

Figure 3 is a diagrammatical side-view with parts broken out of one of the embodiments comprising the tuning body.

Figures 4 and 5 are diagrammatical plan-views of the system embodying a tuning body in combination with a Salomon type damper as described in patent application, Serial No. 333,561.

Figures 6 and 7 represent plan-views with parts broken out of a disk D with a tuning body B.

Figures 8 and 9 represent diagramatically plan-views partly in cross-section with parts broken out of a free disk D provided with tuning bodies B.

Figure 10 is a diagrammatical plan-view partly in cross-section of another embodiment of the damper.

Figures 11 and 12 are plan-views with parts broken out in cross-section, of the disk D with tuning body.

Figure 13 is a plan-view partly in cross-section 13—13 of Figure 14 with parts broken out of another embodiment of the damper provided with tuning body.

Figure 14 is a cross-sectional view of Figure 13.

Figure 15 is a plan-view partly in cross-section with parts broken out of another embodiment of the damper provided with tuning body.

Figure 16 is a cross-sectional view 16—16 of Figure 15.

Figure 17 is a plan-view partly in cross-section with parts broken out of another embodiment of the damper.

Figure 18 is a cross-sectional view of Figure 17.

Figures 1 and 2 illustrate one embodiment of this invention used in combination with a Salomon damper as described in U. S. patent applications identified, briefly described below:

A shaft S is provided with a flywheel F or support member F rigidly affixed to the said shaft by suitable means 50 and/or 51 and/or 52.

A disk D is mounted freely but limitedly rotatable around the shaft S. One, two or more leverweights L are operatively interconnected with the shaft S through the flywheel or support member F, through the pin 53 which is mounted in F or L while passing through the opening 54 in the free disk D, said opening 54 permitting a limited free displacement of the pin in the opening without contacting the free disk D. A connecting roller-pin 55 is mounted in guideways 56 and 57 provided respectively in the lever L and disk D.

Guideways 56 and 57 may be circular in shape or partly circular, or of any desired curve—elliptic, parabolic, hyperbolic, etc. The roller-pin 55 may have a circular cross-section or any suitable curved section permitting the required limited roller displacement.

If torsional irregularities occur in the shaft, the lever L under the action of the disturbances is oscillated upwards and when so forced, must accordingly displace the free disk D angularly by rotating it to and fro.

The embodiment of this invention, as shown in Figures 1 and 2, consists of a mass B (the tuning body) mounted in the free disk D. A cut-out 58 is provided in disk D, in which cut-out the tuning body is mounted so that it may be displaced automatically under the influence of centrifugal force farther away from the axis of rotation when the speed is increased. The guideways 59 may be so chosen that they are parallel to the radius of rotation 60 passing through the center of gravity $B_1$, or they may be at any suitable angle 61 between the radius of rotation 62 and the guideways 63 in the case that the tuning body 64 is mounted in an opening 65 as illustrated in Figure 1.

Resilient means of any nature—rubber, wire, metal, fluid, etc.—are interposed between the tuning body and the free disk.

By way of example: the tuning body B or 64 is provided with resilient means 66 or 67, or both, in such a manner that they are compressed under the influence of centrifugal force acting thereon, through the tuning body B as shown in Figures 1, 2, 3, etc.

The disk D may be provided with supporting means 68 mounted thereon by fixation means 69 to permit an easy placement of the tuning body in the opening 58.

The tuning body and support 68 may be provided with suitable cut-outs 70 in which resilient means may be mounted.

Disk D may be provided with arresting supports 71 and the lever L with resilient shock-absorber means 72 to prevent lever shocks.

This embodiment of a tuning body, or of a plurality of them, on a free disk or on several free disks, if several are used, permits the automatic change of the polar moment of inertia of the free disk in accordance with the speed of rotation of the disk D, i. e. of the damper itself.

The polar moment of inertia of the free disk D is as follows:

$$J = M\rho^2$$

$M$ = the mass of the disk D (including the mass B, the resilient means 51 and/or 52, etc.)
$\rho$ = the radius of gyration of the masses relative to the axis of the shaft S.

In the damper as shown on Figures 1 and 2, masses B are provided, the positions of which, in relation to the axis of the shaft, are variable and a function of the rotating speed of the shaft.

The tuning body continuously remains under the influence of:
1. Centrifugal force 73.
2. The reaction of resilient means 74 and/or 75 (such as mechanical, hydraulic, pneumatic, or magnetic, electro-magnetic means, etc. or any plurality or combination thereof).

The electro-magnetic or mechanical control of the position of the tuning body may be automatic, semi-automatic or voluntary.

The positions of the masses B are determined by the equilibrium between the centrifugal force 73 and the reaction of the resilient means 84. Thus, for every speed (R. P. M.) of the shaft, the mass takes a predetermined position in relation to the axis of the shaft.

At a lower rate of speed, the mass B is nearer to the axis of the shaft S, and at a higher speed, farther away therefrom.

The polar moment of inertia of the free disk changes its value in accordance with the various positions of the mass in relation to the distance from its center of gyration. Thus, the various tunings of the damper correspond to the different polar moments of inertia.

One of the prime aspects of this invention consists in providing a new method for the initial set-up of the damper. This method consists in so calculating the damper that it will be automatically tuned in resonance at a speed corresponding to the speed of the order of disturbance acting on the system.

By way of example: the natural frequency of dampers having a free body or bodies while subjected to the action of centrifugal restoring forces, where such forces actuate as restoring springs for the system, can be expressed by the following formula:

$$\omega^2 = \frac{Co\Omega^2}{M\rho^2} \quad (1)$$

wherein:

$Co$ is a constant depending upon physical dimensions and geometric relations of different components of the damper
$\omega$ = the phase velocity of the vibration
$\Omega$ = the angular velocity of the shaft
$M$ = the mass of the free body
$\rho$ = the radius of gyration of the free body To achieve the highest efficiency over all speed ranges, it is necessary to have $\omega^2$ constant or substantially constant. This can be obtained by making the relation of the variables $$\frac{\Omega^2}{\rho^2}$$

also constant or substantially constant, and this over all speed ranges.

This relation may be expressed by the following equation:

$$\frac{\Omega^2}{\rho^2} = \frac{\omega^2 \cdot M}{Co} \quad (2)$$

which has for the given system and given physical and geometrical damper dimensions a definite value which permits the determination of the magnitude and characteristics of the resilient means such as spring force and spring characteristics, acting at the tuning mass of the free body. The calculation of such resilient means can be effected by the following formula:

$$F_s = \Omega^2 \sqrt{\frac{CoM}{\omega^2}} \quad (3)$$

wherein $F_s$ is the reaction force of the resilient means.

The aforegoing as herein described relative to the development of formulae, presupposes that the tuning mass is concentrated at one point with remaining component parts connected with the tuning mass, considered as mass-less for simplification of the formulae.

These formulae, (1), (2), and (3) are given by way of example only, and in many cases, their application will offer satisfactory results. Correction coefficient "c" could be introduced in any of these formulae, for instance:

$$F_s = c.\Omega^3 \sqrt{\frac{C_0 M}{\omega^2}}$$

wherein "c" may vary according to the result obtained in practice as correction factors.

While the formulae do not limit this invention to their exclusive use, and other methods of calculation may be employed, they are of practical importance and represent one of the aspects of this invention, inasmuch as very satisfactory results are obtained with a damper designed and calculated accordingly.

Figure 4 shows schematically the arrangement illustrated in Figures 1 and 2.

Figure 5 is a similar arrangement wherein the lever L is mounted on a pin 85 mounted in the free disk D and connected operatively through a roller pin 86 to the flywheel or support F rigid with the shaft S.

Another embodiment of this invention consists in providing the tuning body $B_5$ as shown in Figure 6 with one or more resilient means 113 which press toward $B_5$ and also with spring or springs 66 which also work on compression. These arrangements compress spring 66 when the body $B_5$ or the tuning body in other figures, is urged farther away from the axis of rotation, while the spring 113 diminishes its pressure on the tuning body when it takes the place of $B_6$. Controllable means for adjustment of the initial position of $B_5$ and tension in $B_6$ and 113 may be provided.

Figure 7 shows a similar arrangement as that shown in Figure 6, except that the cut-out or guide-way for the tuning body is curved (114, 115). These guideways may follow the radius 116 and 117. An arrangement such as this provides specific characteristics for the changes of the polar moment of inertia in relation to the characteristics of resilient means 66 and/or 66 and 113.

Other types of springs may be employed, such as a blade or blades 101, Figure 11, assisted with a curved supporting guide-means 102 rigidly affixed to the disk D (or web F, Figures 6 and 7), so that the curvature of the support 102 controls the characteristic of the spring according to the required values of the polar moment of inertia of the disk.

In order to reduce the friction of the tuning bodies B, $B_1$ or $B_2$ they may be guided by a slot or by a roller or rollers 103 mounted on a suitable axle on the free disk as shown on Figure 3. Roller-bearings or ball-bearings as shown on Figure 11, 104, 106, may also be provided for this purpose, between the body and the wall 105, or as shown on Figure 12, 107, in place of 103 shown on Figure 3, if desired.

Instead of springs, pneumatic or hydraulic resilient means may be provided, such as shown on Figure 12, wherein the cylinder 110 provided in the tuning body B is mounted on one or more pistons 109 rigid with the free disk D. Compression chamber 110 acting as resilient means, is provided in the tuning body. Piston 109 may be rigid with the body B and the compression chamber 110 provided in the disk D.

Another embodiment of this invention consists in devices provided for controlling the initial characteristic of the reaction of the resilient means. Such devices may consist in adjustable screw arrangement 111, Figure 11, or 112 on Figure 3, or a screw 112 which controls the primary position of the tuning body $B_5$ (or $B_1$, $B_2$, $B_3$) as shown for $B_5$ on Figure 6.

Figures 13, 14 and 15, also Figures 16, 17 and 18 show the tuning body in combination with a Rubissow damper as described in the above identified patent applications. The operation of this device is similar to the operation described in reference to all other figures.

The tuning body B such as described in Figures 1, 2, 3, 4 and 5, may also be represented in an embodiment as shown on Figure 10, wherein the tuning body $B_3$ is itself a lever-weight mounted on an axle 94 which axle is itself mounted on the free disk D, or a part substituting therefor.

$B_3$ may be provided with elastic-stoppers 98. Levers L and tuning body $B_3$ may be provided with adjustable weights 99 or 100, to adjust the weight of L or $B_3$ or both.

In all the embodiments herein described, the resilient means may be of any nature, as aforesaid, i. e. coils, as shown on Figure 10, 95; or in the form of a clock spring 96 as shown on Figure 10; or a combination of blade-springs 97 or 101, mounted on a support D, as shown in Figures 10 and 11, rigid with the free mass D. The blade-springs 97 may be so adapted that the characteristics of their reaction substantially correspond to the polar moment of inertia of the free mass D.

Figure 3 shows the self-tuning body provided with resilient means 75, 76, 77, 78 or 83. The characteristics of such resilient means or any combination thereof may be chosen to best respond to the required changes to be made in the values of the polar moment of inertia of the free disk D.

Resilient means 78 connected to the flexible means 79 which are guided on suitable means 80, i. e. fixed means such as rollers, pulleys, etc., attached to the tuning body B on 81 and 82, and operating on extension, while the resilient means 75, 76 or 77 are compressed under the influence of centrifugal forces.

If desired, only one resilient means may be employed, i. e. only one spring 83, or 78 working on extension, or only one means such as 75, 76 or 77, working on compression, or any one combination thereof. Elastic means serving as arresting means may be provided, as shown in 72, Figure 1, and 84, Figure 3.

Figure 8 shows the weight $B_8$ provided with conical or other-shaped cut-outs 150 on one of the appropriate sides or edges of the tuning body. A pusher 151 of a similar shape is provided in a disk $D_8$ assisted by resilient means 153, the tension of which, if desired, may be controlled by a screw 152. This pusher will serve to permit the body to move farther away from the center of rotation step by step, as soon as the centrifugal force acting on the body will be sufficient to overcome the resistance between the pusher 151 and the body due to their operative engagement.

The pusher 151 may be mounted either in the disk $D_8$ or in the body $B_9$.

Pusher 151 may be replaced by a roller 157, as is shown on Figure 8, mounted on a suitable axle 161 on the pusher 158, which may itself be urged not by a spring 153 but by a weight 159 mounted on a lever through the intermediary of a pivotal axle 160 and a forked opening 162 wherein the axle is engaged.

Figure 9 shows the weight B₁₀ urged, for purposes of example, by a spring 165, provided with a pusher 172 which is urged by resilient means 173 and registers in the grooves or cut-outs mounted in a member 166 which is adjustable as it slides along a groove 168 on a member 167. Member 166 may be made adjustable by means of a screw 169 mounted in the supports 170 and 171.

Elastic means 175 may be provided to prevent shocks.

If desired, instead of the pusher 172, a member 176 may be rigidly affixed to the tuning body B₁₁ rotating on the axle 174. This member must overcome the resistance of a lever 179 mounted on a pivot 180 and urged by the spring 181 mounted in the support 182. Support 182 is mounted rigidly on the disk D₁₁, on which arresting means is also provided.

Another lever 177 is mounted on a pivot 178 which pivot is mounted on the free end of the lever 179, the operation of which device is self-explanatory.

Arrangements such as provided in Figures 8 and 9 provide a kind of step-by-step control before the mass B₁₁ can move. It must be subjected to a certain amount of centrifugal force to overcome the resistance of the levers 177 and 179, due to the spring 181.

The device as shown on Figures 1, 2, 8, 9 and 10, is provided with several tuning bodies—two, three, four or any number desired—mounted so that they are distributed symmetrically around the axis of the shaft of rotation.

In case all the springs and all the tuning bodies are substantially identical, they will displace themselves under the influence of centrifugal force at substantially the same distance (theoretically, at the same distance).

During rotation, some slight variation in displacement will be caused due to mechanical fatigue, etc. of the resilient means, in which case, it may happen that one of the tuning bodies will be displaced at the same speed at a slightly different distance from the axis of rotation than from the tuning bodies. To prevent this, it is a matter of simply introducing synchronous automatically operated interconnecting means, such as a toothed member mounted on every tuning body and interconnected with one or a plurality of toothed gears, or employing a chain or belt-like arrangement affixed to the tuning bodies interconnected with an equalizer member provided therefor, permitting the displacement of one tuning body for a given dimension only if the other tuning bodies are displaced for exactly the same dimensions.

These arrangements are self-evident and are not shown on the drawings.

With reference to the fixation of the resilient means, one end of the resilient means contacts or is affixed to a suitable part of a tuning body B, and the other end affixed not to a part of the disk D but to an appropriate part of the lever L or the member F which is rigid with the shaft. This is not shown on the drawings, being self-evident. The relatively small angular displacements of the disk D in respect to the lever, or the member F, will cause small angular displacements of that end of the resilient means which is affixed either to the lever L or the member F. These small displacements will, in many cases, permit the mounting of the tuning body somewhere either on the outer surface of the disk or inside of it.

This invention, as aforesaid, may be applied to any kind of rotatable part, but is particularly applicable to the following:

2 or 4 stroke marine engines
Propeller hub of aeroplanes or ships
Steam turbines
Centrifugal pumps
Aeroplane engines
Super-charger drives for aeroplanes or other engines
Textile spindles
Machine tools of any nature
Grinders, washing machines
Moving picture projectors
Motors for phonographs
Driving devices for fluid mirrors such as used for telescopes or other visual means.

Having now particularly described and ascertained the nature of the said invention, what we claim is:

1. In apparatus of the class described, a rotatable system comprising a driven member, and means for damping oscillations of said member including a mass oscillatable relative to the latter and means mounted on said mass for automatically varying the polar moment of inertia of said damping means in accordance with the speed of rotation of said system.

2. In combination, rotatable means comprising a driven member, and means for damping oscillations of said member including a mass movable relative to said member and centrifugally responsive means for automatically varying the polar moment of inertia of said damping means in response to changes in the angular velocity of said rotatable means, said centrifugally responsive means including an element movably mounted on said mass and resilient means for resisting the entire outward movement of said element in response to centrifugal forces, at least a portion of said resilient means being operable to resist only a portion of said movement.

3. The combination with a rotatable part of means for damping oscillations of said rotatable part, said damping means including a mass rotated by and movable relative to said part, and centrifugally responsive means mounted on and movable relative to said mass for automatically varying the polar moment of inertia of said damping means in accordance with the angular velocity of said rotatable part.

4. In apparatus of the class described, a rotatable system comprising a rotatable member and means for damping oscillations of said member, said damping means including at least one solid element oscillatable relative to said member in opposition to centrifugal forces created during rotation of said system and solid means operatively associated with said element for automatically varying the polar moment of inertia of said damping means in accordance with the angular velocity thereof.

5. A rotatable system comprising a rotatable member and means for damping oscillatory disturbances of said member, said damping means including at least one element adapted for limited oscillatory movement relative to said member in opposition to centrifugal forces created during rotation of the latter and centrifugally responsive solid means for automatically varying the polar moment of inertia of said damping means during rotation of said system.

6. In apparatus of the class described, a rotatable system comprising a driven member, and means for damping oscillations of said member, said means including a mass oscillatable relative to said member and means for automatically varying the polar moment of inertia of said damping means comprising solid weight means mounted on said mass and movable relative thereto in response to centrifugal forces acting thereon and resilient means for yieldably resisting movement of said weight means by said centrifugal forces.

7. In apparatus of the class described, a rotatable member, and means rotatable with said member for damping oscillations thereof, said damping means including at least one solid element oscillatable relative to said member in opposition to centrifugal forces created during rotation of said member and means for automatically varying the polar moment of inertia of said damping means comprising weight means mounted on said element and movable relative thereto in response to centrifugal forces acting thereon and resilient means for yieldably resisting movement of said weight means by said last-named forces.

8. In apparatus of the class described, rotatable means, and means including a mass rotated by and angularly movable relative to said rotatable means for damping oscillatory disturbances of said rotatable means during rotation thereof, said damping means also including means for automatically varying the polar moment of inertia thereof comprising at least one solid mass mounted on said first-named mass and movable relative thereto in response to centrifugal forces and means for yieldably resisting relative movement of said masses by said forces.

9. The combination with a rotatable part of solid means for damping oscillatory disturbances of said part, said damping means being of the type which may be tuned for damping an oscillatory disturbance of a predetermined order, and centrifugally responsive means rotatable with said part and damping means for automatically varying the tuning of said damping means whereby the latter is rendered effective to damp oscillatory disturbances of a plurality of different orders.

10. In apparatus of the class described, a rotatable system comprising a rotatable member, and tunable means including an oscillatable element for damping oscillatory disturbances of said member, said means comprising means for automatically tuning said damping means during rotation of said system for rendering said damping means operative to effectively damp disturbances of different orders at different speeds of rotation of said system, said tuning means including at least one centrifugally responsive element mounted on and movable relative to said oscillatable element and means for controlling the relative movement of said elements including a yieldably resisted plunger movably mounted on one of said elements and adapted to selectively extend into spaced recesses on the other of said elements.

11. In apparatus of the class described, a rotatable system comprising a rotatably driven member, and tunable damping means for damping oscillations of said member including centrifugally responsive means for automatically tuning said damping means for different orders of oscillatory disturbances and means for yieldably holding said centrifugally responsive means in different predetermined radial positions relative to the axis of rotation of said system during different ranges of speeds of rotation of said system.

12. In apparatus of the class described, a rotatable member, means rotatable with said member for damping oscillatory disturbances thereof, said damping means including at least one element oscillatable relative to said member in opposition to centrifugal forces and centrifugally responsive means for automatically tuning said damping means to render the same operative to effectively damp oscillatory disturbances of different orders without varying the weight of the oscillatable elements of said damping means.

13. In apparatus of the class described, a rotatable system comprising a rotatable member, and tunable damping means for damping oscillatory disturbances of said member comprising solid means for automatically tuning said damping means including at least one mass movable radially relative to the axis of rotation of said system in response to centrifugal forces and means for yieldably resisting movement of said mass by said forces.

14. In apparatus of the class described, a rotatable system comprising a driven member subjected in operation to oscillatory disturbances of different orders, and means including a mass oscillatable relative to said member for damping the oscillatory disturbances of said member, said damping means including means movable in response to centrifugal forces for automatically tuning said damping means during rotation of said system without varying the weight of said oscillatable mass for rendering said damping means operative to effectively damp disturbances of different orders at different speeds of rotation of said system.

15. In apparatus of the class described, rotatable means, and means rotatable with and oscillatable relative to said rotatable means for damping oscillatory disturbances thereof, said damping means including means operative in accordance with the speed of said rotatable means for automatically tuning said damping means to render the same operative for effectively damping each of a plurality of oscillatory disturbances of different orders when the angular velocity of said rotatable means is such that the frequency of such an oscillatory disturbance is approximately in resonance with the natural frequency of said rotatable means, the weight of said oscillatable damping means being constant for all speeds of rotation.

16. In apparatus of the class described, rotatable means, and a single damping means rotatable with said rotatable means and operative for effectively damping oscillatory disturbances of different orders in said rotatable means at different speeds of rotation of the latter, said damping means including an element oscillatable relative to said rotatable means against the resistance of centrifugal forces and an element movable in response to centrifugal forces against the resistance of resilient means, said second-named element being solid and movably mounted on said first-named element.

17. In apparatus of the class described, rotatable means, and means for damping oscillations of said rotatable means, said damping means comprising means oscillatable relative to said rotatable means and returnable to equilibrium position by centrifugal forces, said oscillatable means including means movable from equilibrium position by centrifugal forces against a yieldable resisting force whereby said damping means is rendered operative to dampen oscillatory disturbances of different orders, the weight of said oscillatable means being constant for all speeds of rotation.

18. Apparatus for reducing oscillatory disturbances comprising rotatable means, weight means, means operably connecting said two first-named means whereby said weight means rotate with and are adapted for limited oscillation from a mean position relative to said rotatable means, said connecting means including means movable in response to centrifugal forces acting thereon for restoring said weight means to said mean position, and tuning means comprising a mass rotatable with said three first-named means and movable relative thereto in response to centrifugal forces and yieldable means interposed between said mass and one of said three first-named means for resisting movement of said mass by said centrifugal forces.

19. In apparatus of the class described, rotatable driving means comprising a member, oscillatable means comprising a weight member, an element mounted on said weight member for movement relative thereto in response to centrifugal forces acting thereon and means for yieldably resisting said movement, and means operatively connecting said driving means and said oscillatable means for imparting rotary motion to the latter, said connecting means including centrifugally responsive means pivotally mounted on one of said members and non-resilient force transmitting means engageable by and movable along curved surfaces on said centrifugally responsive means and the other of said members.

20. In apparatus of the class described, rotatable driving means, weight means mounted on and adapted for oscillatory movement relative to said driving means, said weight means including means movable away from the axis of rotation of said driving means in response to centrifugal forces and means for yieldably resisting said movement of said movable means, and means for operatively connecting said driving means and said weight means to impart rotary motion to the latter, said connecting means comprising centrifugally responsive means pivotally mounted on one of the two first-named means and so connected with the other of said two first-named means that the centrifugal force of said centrifugally responsive means is rendered effective to apply a force to said other means for urging said weight means toward a predetermined means position relative to said driving means from either side of said position.

21. Apparatus for reducing oscillations of a rotatable part comprising oscillatable damping means including means movable in response to centrifugal forces during rotation thereof and means comprising at least two springs for resisting movement of said movable means, only one of said springs being active at predetermined low speeds of rotation and both of said springs being active at higher speeds, and means operatively connecting said damping means and said rotatable part whereby said damping means is caused to rotate with and is adapted for limited oscillation relative to said rotatable part, said connecting means including centrifugally responsive means adapted to exert a force which acts in only one general direction with respect to said damping means for restoring the latter to a predetermined mean position relative to said part from either side of said position.

22. Apparatus for reducing oscillations of a rotatable part comprising oscillatable damping means including means movable in response to centrifugal forces acting thereon and means for yieldably holding said centrifugally responsive means in different predetermined radial positions relative to the axis of rotation thereof during different ranges of speeds of rotation, and means operatively connecting said damping means and said rotatable part whereby said damping means is caused to rotate with and is adapted for limited oscillation relative to said rotatable part, said connecting means including centrifugally responsive means adapted to exert a force which acts in only one general direction with respect to said damping means for restoring the latter to a predetermined mean position relative to said part from either side of said position.

23. In apparatus of the class described, a rotatable system comprising a driven member, and means for damping oscillations of said member including a solid mass rotatable with and oscillatable relative to said member and solid means mounted on said mass for movement relative thereto for automatically varying the polar moment of inertia of said damping means in accordance with the speed of rotation of said system.

24. In apparatus of the class described, a rotatable system comprising driven means and means for damping oscillations of said first-named means, said damping means including a solid mass mounted on and oscillatable relative to said first-named means and solid means adjustably mounted on said mass for movement relative thereto and radially with respect to the axis of rotation of said system for varying the polar moment of inertia of said damping means to vary the tuning of the latter.

25. In apparatus of the class described, a rotatable system comprising a driven member and means for damping vibrations of said member including a mass rotatable with and oscillatable relative to said member and means adjustably mounted on said mass for movement in a radial direction relative to the axis of rotation of said system for varying the polar moment of inertia of said damping means.

ZACHAR ARKUS-DUNTOV.
GEORGE A. RUBISSOW.